(12) United States Patent
Nakai et al.

(10) Patent No.: US 11,089,033 B2
(45) Date of Patent: Aug. 10, 2021

(54) INTRUSION DETECTION DEVICE, INTRUSION DETECTION METHOD, AND COMPUTER READABLE MEDIUM

(71) Applicant: MITSUBISHI ELECTRIC CORPORATION, Tokyo (JP)

(72) Inventors: Tsunato Nakai, Tokyo (JP); Teruyoshi Yamaguchi, Tokyo (JP); Koichi Shimizu, Tokyo (JP); Nobuhiro Kobayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 279 days.

(21) Appl. No.: 16/081,397

(22) PCT Filed: Apr. 26, 2016

(86) PCT No.: PCT/JP2016/063086
§ 371 (c)(1),
(2) Date: Aug. 30, 2018

(87) PCT Pub. No.: WO2017/187520
PCT Pub. Date: Nov. 2, 2017

(65) Prior Publication Data
US 2021/0006570 A1   Jan. 7, 2021

(51) Int. Cl.
*H04L 29/06*       (2006.01)
(52) U.S. Cl.
CPC ...... *H04L 63/1416* (2013.01); *H04L 63/0254* (2013.01); *H04L 63/101* (2013.01); *H04L 63/105* (2013.01)

(58) Field of Classification Search
CPC ............. H04L 63/1416; H04L 63/0254; H04L 63/101; H04L 63/105
See application file for complete search history.

(56) References Cited

U.S. PATENT DOCUMENTS 8,291,495 B1 * 10/2012 Burns ................... H04L 63/168
726/23
9,245,147 B1   1/2016 Williams et al.
(Continued)

FOREIGN PATENT DOCUMENTS

CN    104899513 A    9/2015
EP    3 002 648 A2   4/2016
(Continued)

OTHER PUBLICATIONS

Extended European Search Report for European Application No. 17893204.2, dated Oct. 11, 2019.
(Continued)

*Primary Examiner* — Shin-Hon (Eric) Chen
(74) *Attorney, Agent, or Firm* — Birch, Stewart, Kolasch & Birch, LLP.

(57) ABSTRACT

A state detection section (105) detects states of a plurality of controllers (300, 400) included in a communication system (600). An attack determination section (103) selects, from among a plurality of whitelists (110) each of which is associated with a combination of states, a whitelist (110) associated with the combination of the states of the plurality of controllers (300, 400) detected by the state detection section (105). The attack determination section (103) detects an attack on the communication system (600) by using the selected whitelist (110).

5 Claims, 9 Drawing Sheets

(56) References Cited

U.S. PATENT DOCUMENTS

| | | |
|---|---|---|
| 2003/0172166 A1 | 9/2003 | Judge et al. |
| 2003/0172167 A1 | 9/2003 | Judge et al. |
| 2003/0172291 A1 | 9/2003 | Judge et al. |
| 2003/0172292 A1 | 9/2003 | Judge |
| 2003/0172294 A1 | 9/2003 | Judge |
| 2003/0172301 A1 | 9/2003 | Judge et al. |
| 2003/0172302 A1 | 9/2003 | Judge et al. |
| 2005/0154916 A1* | 7/2005 | Boulanger ......... H04L 63/1416 726/4 |
| 2006/0015563 A1 | 1/2006 | Judge et al. |
| 2006/0015942 A1 | 1/2006 | Judge et al. |
| 2006/0021055 A1 | 1/2006 | Judge et al. |
| 2006/0174341 A1 | 8/2006 | Judge |
| 2006/0248156 A1 | 11/2006 | Judge et al. |
| 2006/0251068 A1 | 11/2006 | Judge et al. |
| 2006/0253447 A1 | 11/2006 | Judge |
| 2006/0265747 A1 | 11/2006 | Judge |
| 2006/0267802 A1 | 11/2006 | Judge et al. |
| 2007/0006293 A1* | 1/2007 | Balakrishnan ...... H04L 63/1408 726/13 |
| 2007/0027992 A1 | 2/2007 | Judge et al. |
| 2007/0130350 A1 | 6/2007 | Alperovitch et al. |
| 2007/0130351 A1 | 6/2007 | Alperovitch et al. |
| 2007/0195753 A1 | 8/2007 | Judge et al. |
| 2007/0195779 A1 | 8/2007 | Judge et al. |
| 2007/0300286 A1 | 12/2007 | Judge |
| 2008/0175226 A1 | 7/2008 | Alperovitch et al. |
| 2008/0178259 A1 | 7/2008 | Alperovitch et al. |
| 2008/0184366 A1 | 7/2008 | Alperovitch et al. |
| 2008/0263665 A1* | 10/2008 | Ma ..................... H04L 63/1416 726/23 |
| 2008/0271141 A1* | 10/2008 | Goldman ............ H04L 63/0245 726/22 |
| 2009/0167520 A1 | 7/2009 | Watanabe et al. |
| 2010/0306846 A1 | 12/2010 | Alperovitch et al. |
| 2012/0030761 A1 | 2/2012 | Baba et al. |
| 2012/0204265 A1 | 8/2012 | Judge |
| 2012/0271890 A1 | 10/2012 | Judge et al. |
| 2014/0115578 A1* | 4/2014 | Cooper ............... H04L 63/1416 718/1 |
| 2014/0115663 A1 | 4/2014 | Fujishima et al. |
| 2014/0123276 A1* | 5/2014 | Bush ....................... G06F 21/62 726/21 |
| 2014/0201528 A1 | 7/2014 | Krig et al. |
| 2014/0283047 A1 | 9/2014 | Dixit et al. |
| 2015/0319137 A1 | 11/2015 | Krig et al. |
| 2016/0085237 A1* | 3/2016 | Yunoki ............... G05B 23/0235 726/22 |
| 2016/0094578 A1* | 3/2016 | McQuillan ......... H04L 63/1416 726/23 |
| 2017/0279622 A1 | 9/2017 | Yamaguchi et al. |

FOREIGN PATENT DOCUMENTS

| | | |
|---|---|---|
| JP | 2001-34553 A | 2/2001 |
| JP | 2004-312176 A | 11/2004 |
| JP | 2005-520230 A | 7/2005 |
| JP | 2009-223375 A | 10/2009 |
| JP | 2010-015513 A | 1/2010 |
| JP | 2012-034273 A | 2/2012 |
| JP | 2014-86822 A | 5/2014 |
| JP | 2014-179074 A | 9/2014 |
| JP | 5844944 B2 | 11/2015 |
| JP | 6054010 B2 | 12/2016 |
| KP | 10-2013-0034773 | 4/2013 |
| KR | 10-2013-0034773 | 4/2013 |
| TW | 201541899 A | 11/2015 |
| WO | WO 2016/113911 A1 | 7/2016 |
| WO | WO 2014/155850 A1 | 2/2017 |

OTHER PUBLICATIONS

International Search Report issued in corresponding Application No. PCT/JP2017/001690 dated Apr. 18, 2017.

Extended European Search Report issued in corresponding European Application No. 16900393.6 dated Feb. 20, 2019.

European Office Action for European Application No. 16900393.6, dated Jul. 16, 2019.

Office Action issued in corresponding Korean Application No. 10-2018-7029834 dated Apr. 25, 2019.

International Search Report for PCT/JP2016/063086 (PCT/ISA/210) dated Aug. 2, 2016.

Kang et al., "Whitelists Based Multiple Filtering Techniques in SCADA Sensor Networks" Journal of Applied Mathematics, vol. 2014, Article ID 597697, total of 8 pages.

Office Action dated Apr. 18, 2018 for the corresponding Taiwanese Application No. 105122571.

Office Action dated Dec. 27, 2017 for the corresponding Taiwanese Application No. 105122571.

Yamaguchi et al., "Survey and Discussion of Intrusion Detection Method for Industrial control System", SCIS 2015, the 32nd Symposium on Cryptography and Information Security Kokura, Japan, Jan. 20-23, 2015, the Institute of Electronics, Information and Communication Engineers, total of 8 pages.

Office Action issued in corresponding Korean Application No. 10-2018-7029834 dated Aug. 27, 2019, with English translation.

Notification of Reason for Refusal issued in related Korean Application No. 10-2018-7029834 dated Dec. 14, 2018.

Office Action dated Jan. 1, 2021 in corresponding Indian Application No. 201847037674.

U.S. Appl. No. 16/464,150, filed May 24, 2019.

Office Action dated Apr. 27, 2021 in co-pending U.S. Appl. No. 16/464,150.

Office Action dated May 25, 2021 in corresponding Chinese Application No. 201680084679.4.

* cited by examiner

Fig. 6

| PRE-TRANSITION CONTROL STATE | TRANSITION CONDITION | POST-TRANSITION CONTROL STATE |
|---|---|---|
| PAUSE | IGNITION INSTRUCTION | IGNITION |
| IGNITION | OPERATION INSTRUCTION | OPERATION |
| OPERATION | COOLING INSTRUCTION | COOLING |
| ... | ... | ... |

| SYSTEM STATE | PROTOCOL | TRANSMISSION SOURCE INFORMATION | TRANSMISSION DESTINATION INFORMATION | DATA LENGTH [Byte] | COMMAND | PAYLOAD CONDITION | CYCLE CONDITION [ms] |
|---|---|---|---|---|---|---|---|
| SS1 | CONTROL NETWORK | 192.168.0.1 any | 192.168.0.2 9000 | 32 | MEM WRITE | SETTING VALUE 0-1000 | 50 |
| SS2 | MAINTENANCE NETWORK | 192.168.0.1 any | 192.168.0.2 9000 | 2048 | DATA READ | — | 1000 |
| ⋮ | | | | | | | |
| SS2 | MAINTENANCE NETWORK | 192.168.0.1 any | 192.168.0.2 9000 | 2048 | DATA WRITE | — | — |
| SS3 | MAINTENANCE NETWORK | 192.168.0.1 any | 192.168.0.2 9000 | 1024 | DATA READ | — | 1000 |

110

US 11,089,033 B2

INTRUSION DETECTION DEVICE, INTRUSION DETECTION METHOD, AND COMPUTER READABLE MEDIUM

TECHNICAL FIELD

The present invention relates to an intrusion detection device, an intrusion detection method, and an intrusion detection program.

BACKGROUND ART

In recent years, cases are increasing, in which industrial control systems connected to networks become targets of cyber attacks.

In an industrial control system, an intrusion detection system is used to detect a cyber attack on an industrial control system.

A conventional intrusion detection system detects a cyber attack with a whitelist by utilizing fact that substantially fixed network communication of an industrial control system is performed. In a whitelist, permitted communication is defined by a pair of a transmission destination address and a transmission source address, a communication protocol and the like. In the conventional intrusion detection system, a pair of a transmission destination address and a transmission source address, a communication protocol and the like of communication data are compared with a pair of a transmission destination address and a transmission source address, a communication protocol and the like defined in the whitelist. Then, the conventional intrusion detection system blocks the communication data when the pair of the transmission destination address and the transmission source address, the communication protocol and the like do not match between the communication data and the whitelist (Non-Patent Literature 1).

Non-Patent Literature 2 discloses an intrusion detection device (host type intrusion detection device) that switches between whitelists according to the state of a device to be monitored. According to the intrusion detection device of Non-Patent Literature 2, highly accurate detection according to the state of the device is realized.

CITATION LIST

Non-Patent Literature

Non-Patent Literature 1: Dong Ho Kang, Byoung Koo Kim, Jung Chan Na, Kyoung Son Jhang, "Whitelists Based Multiple Filtering Techniques in SCADA Sensor Networks", Journal of Applied Mathematics Volume 2014

Non-Patent Literature 2: Teruyoshi Yamaguchi, Koichi Shimizu, Nobuhiro Kobayashi, "Survey and Discussion of Intrusion Detection Method for Industrial Control System", 2015 Cryptography and Information Security Symposium

SUMMARY OF INVENTION

Technical Problem

A whitelist in Non-Patent Literature 2 defines normal communication per device. Further, an intrusion detection device in Non-Patent Literature 2 selects a whitelist according to the state of each device, and monitors communication using the selected whitelist.

For this reason, Non-Patent Literature 2 has a problem that it is impossible to detect an attack, combination of which with communication which is determined to be normal based on the whitelist per device causes an abnormal operation.

A main object of the present invention is to solve such a problem. In other words, a main object of the present invention is to be able to detect an attack, combination of which with communication which is determined to be normal based on the whitelist per device causes an abnormal operation

Solution to Problem

An intrusion detection device according to the present invention, includes:

a state detection section to detect states of a plurality of devices included in a communication system;

a selection section to select, from among a plurality of whitelists each of which is associated with a combination of states, a whitelist associated with the combination of the states of the plurality of devices detected by the state detection section; and an attack detection section to detect an attack on the communication system by using the whitelist selected by the selection section.

Advantageous Effects of Invention

In the present invention, a whitelist corresponding to a combination of states of a plurality of devices included in a communication system is selected from among a plurality of whitelists each of which is prepared in association with combinations of states. Therefore, according to the present invention, it is possible to detect an attack, combination of which with communication which is determined to be normal based on the whitelist per device causes an abnormal operation.

BRIEF DESCRIPTION OF DRAWINGS

FIG. 6 is a diagram illustrating an example of a state transition rule according to the embodiment 1.

FIG. 7 is a diagram illustrating an example of a whitelist according to the embodiment 1.

DESCRIPTION OF EMBODIMENTS

Embodiment 1

*Description of the Configuration*

Figure 1:
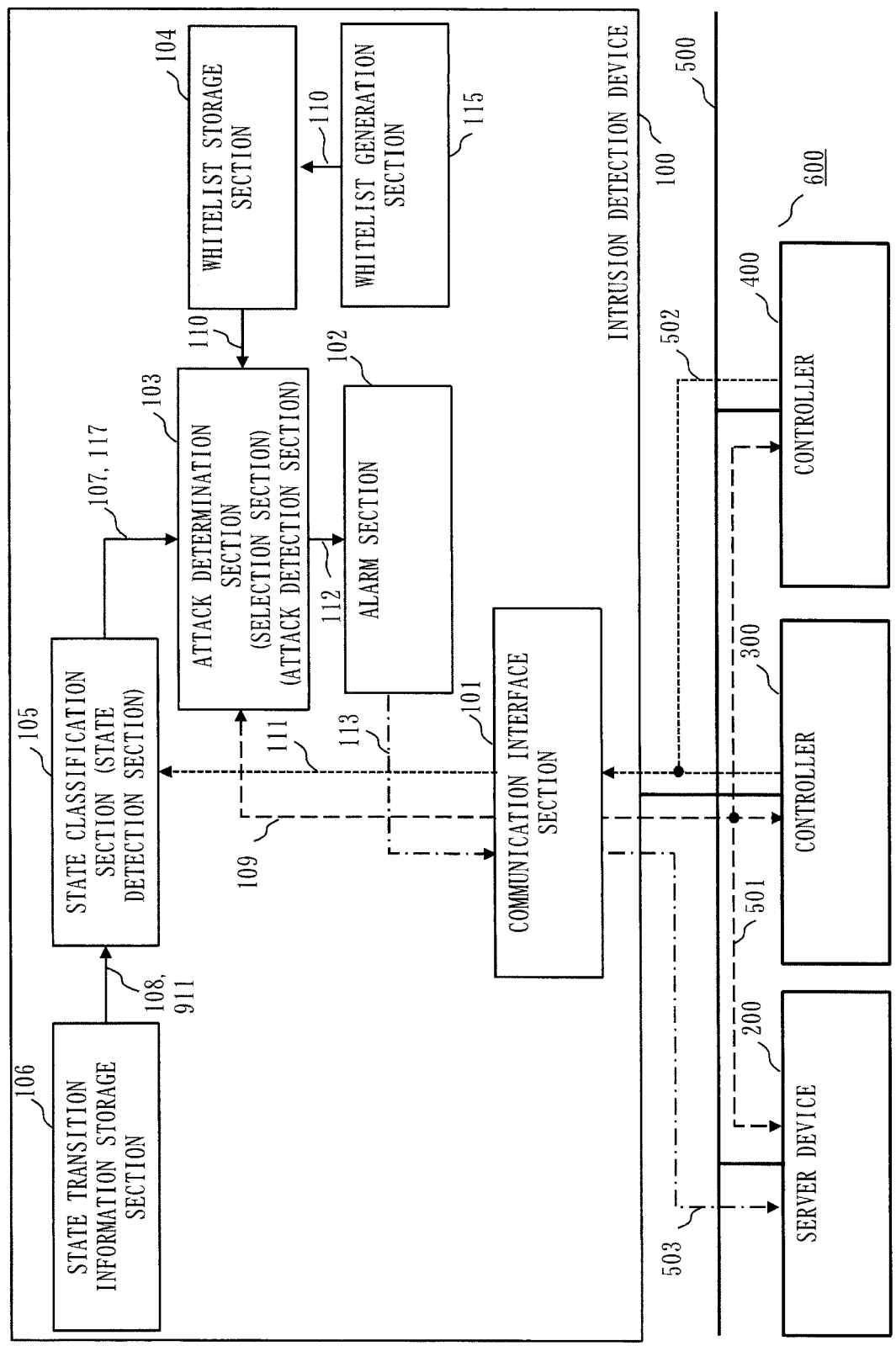
FIG. 1 is a diagram illustrating an example of a configuration of an intrusion detection device and a communication system according to an embodiment 1.

FIG. 1 illustrates an intrusion detection device 100 and a communication system 600 according to the present embodiment.

The communication system 600 includes a server device 200, a controller 300 and a controller 400. The server device 200, the controller 300 and the controller 400 are connected to a network 500. The communication system 600 is, for example, an industrial control system.

The intrusion detection device 100 is connected to the network 500, receives state information 502 transmitted from the controller 300 and the controller 400, and detects the states of the controller 300 and the controller 400. From the state information 502, the intrusion detection device 100 can identify a current control state (hereinafter simply referred to as a state) of the controller 300 or the controller 400. The state information 502 may be a dedicated signal for notifying the control state or a signal such as a sensor value with which the control state can be distinguished.

In addition, the intrusion detection device 100 collects communication data 501 communicated between the server device 200 and the controller 300 or the controller 400. In addition, the intrusion detection device 100 collates collected communication data 109 with a whitelist and detects an attack on the communication system 600. The communication data 501 after being received by a communication interface section 101 is indicated as the communication data 109.

As illustrated in FIG. 1, the intrusion detection device 100 includes the communication interface section 101, an alarm section 102, an attack determination section 103, a whitelist storage section 104, a state classification section 105, a state transition information storage section 106, and a whitelist generation section 115. It is noted that details of these components will be described later.

The operation performed by the intrusion detection device 100 is an example of an intrusion detection method.

The controller 300 and the controller 400 are devices to be monitored by the intrusion detection device 100.

Each of the controller 300 and the controller 400 transmits and receives the communication data 501 to and from the server device 200. Further, each of the controller 300 and the controller 400 transmits the state information 502 to the intrusion detection device 100.

It is noted that when it is not necessary to distinguish between the controller 300 and the controller 400, each of them is simply indicated as a controller.

The server device 200 manages the controller 300 and the controller 400.

Figure 2:
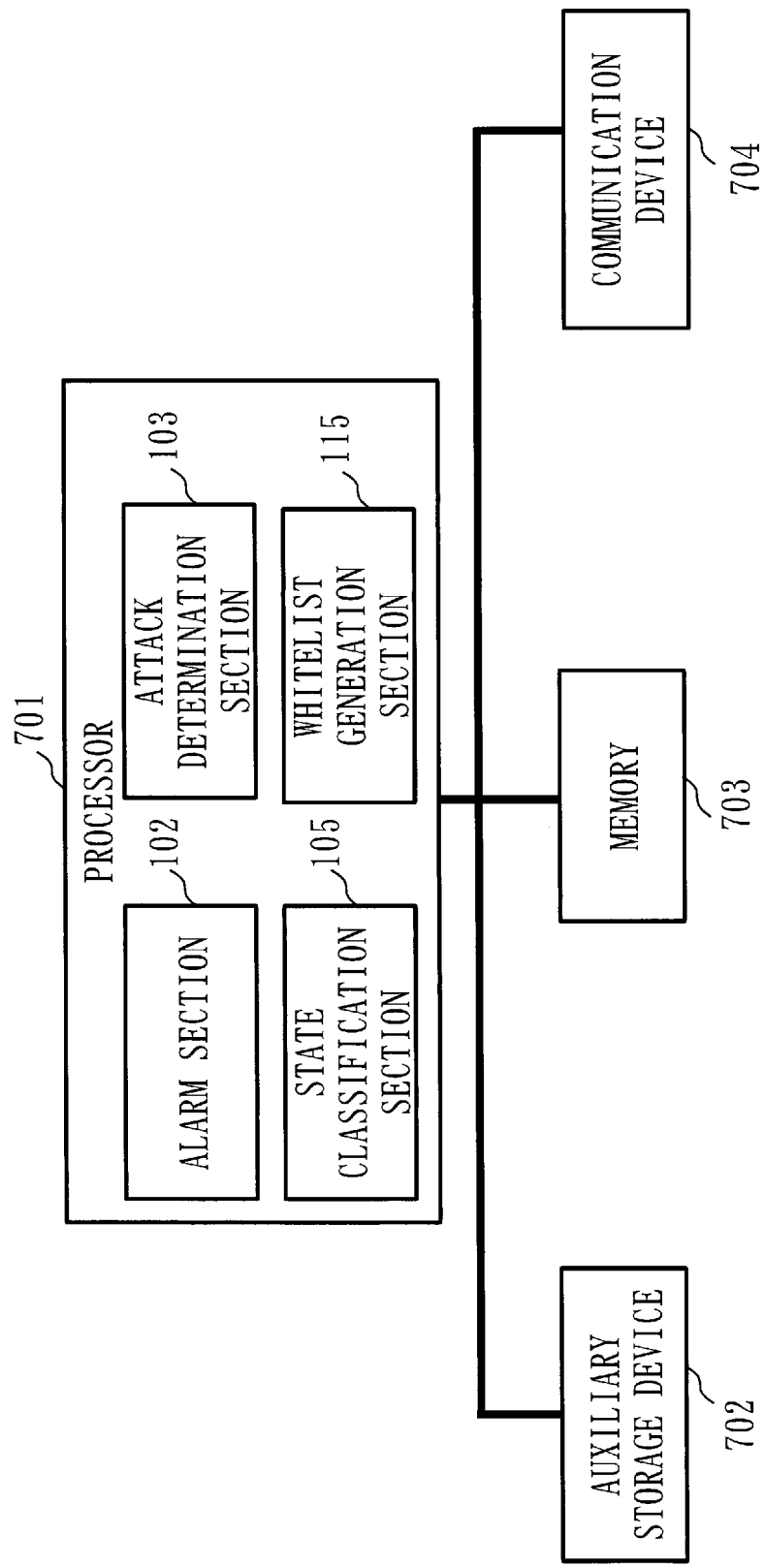
FIG. 2 is a diagram illustrating an example of a hardware configuration of the intrusion detection device according to the embodiment 1.

FIG. 2 illustrates an example of a hardware configuration of the intrusion detection device 100.

The intrusion detection device 100 according to the present embodiment is a computer.

The intrusion detection device 100 includes, as hardware, a processor 701, an auxiliary storage device 702, a memory 703, and a communication device 704.

A program to realize functions of the alarm section 102, the attack determination section 103, the state classification section 105, and the whitelist generation section 115 illustrated in FIG. 1 is stored in the auxiliary storage device 702. That is, the alarm section 102, the attack determination section 103, the state classification section 105, and the whitelist generation section 115 illustrated in FIG. 1 are realized by the program.

It is noted that the program to realize functions of the attack determination section 103 and the state classification section 105 corresponds to an intrusion detection program.

The program to realize functions of the alarm section 102, the attack determination section 103, the state classification section 105, and the whitelist generation section 115 is loaded into the memory 703 and executed by the processor 701.

FIG. 2 schematically illustrates a state in which the processor 701 is executing the program to realize functions of the alarm section 102, the attack determination section 103, the state classification section 105, and the whitelist generation section 115.

The auxiliary storage device 702 and/or the memory 703 function as the whitelist storage section 104 and the state transition information storage section 106 illustrated in FIG. 1.

The communication device 704 communicates with the server device 200, the controller 300, and the controller 400 via the network 500. The communication device 704 functions as the communication interface section 101 illustrated in FIG. 1.

Next, details of the communication interface section 101, the alarm section 102, the attack determination section 103, the whitelist storage section 104, the state classification section 105, the state transition information storage section 106, and the whitelist generation section 115 illustrated in FIG. 1 will be described.

The communication interface section 101 receives the communication data 501 transmitted and received by the server device 200, the controller 300, and the controller 400 via the network 500. Then, the communication interface section 101 outputs the received communication data 501 to the attack determination section 103.

Further, the communication interface section 101 receives the state information 502 from the controller 300 and the controller 400. Then, the communication interface section 101 outputs the received state information 502 to the state classification section 105. The state information 502 after being received by the communication interface section 101 is indicated as state information 111.

The communication interface section 101 receives an alarm 113 from the alarm section 102, and transmits the received alarm 113 to the server device 200 as an alarm 503.

In this manner, the communication interface section 101 transmits and receives data between the elements inside the intrusion detection device 100 and the network 500.

The state transition information storage section 106 holds a state transition rule 108. Preset normal state transitions respective controllers are defined in the state transition rule 108. The state transition rule 108 is the information illustrated in FIG. 6. As illustrated in FIG. 6, a pre-transition control state, a transition condition, and a post-transition control state are defined in the state transition rule 108. The state transition information storage section 106 holds a state transition rule 108 for each controller.

In addition, the state transition information storage section 106 holds a system state rule 911. A system state and the states of the respective controllers constituting the system state are defined in the system state rule 911. That is, the system state means a combination of the states of the respective controllers.

Figure 5:
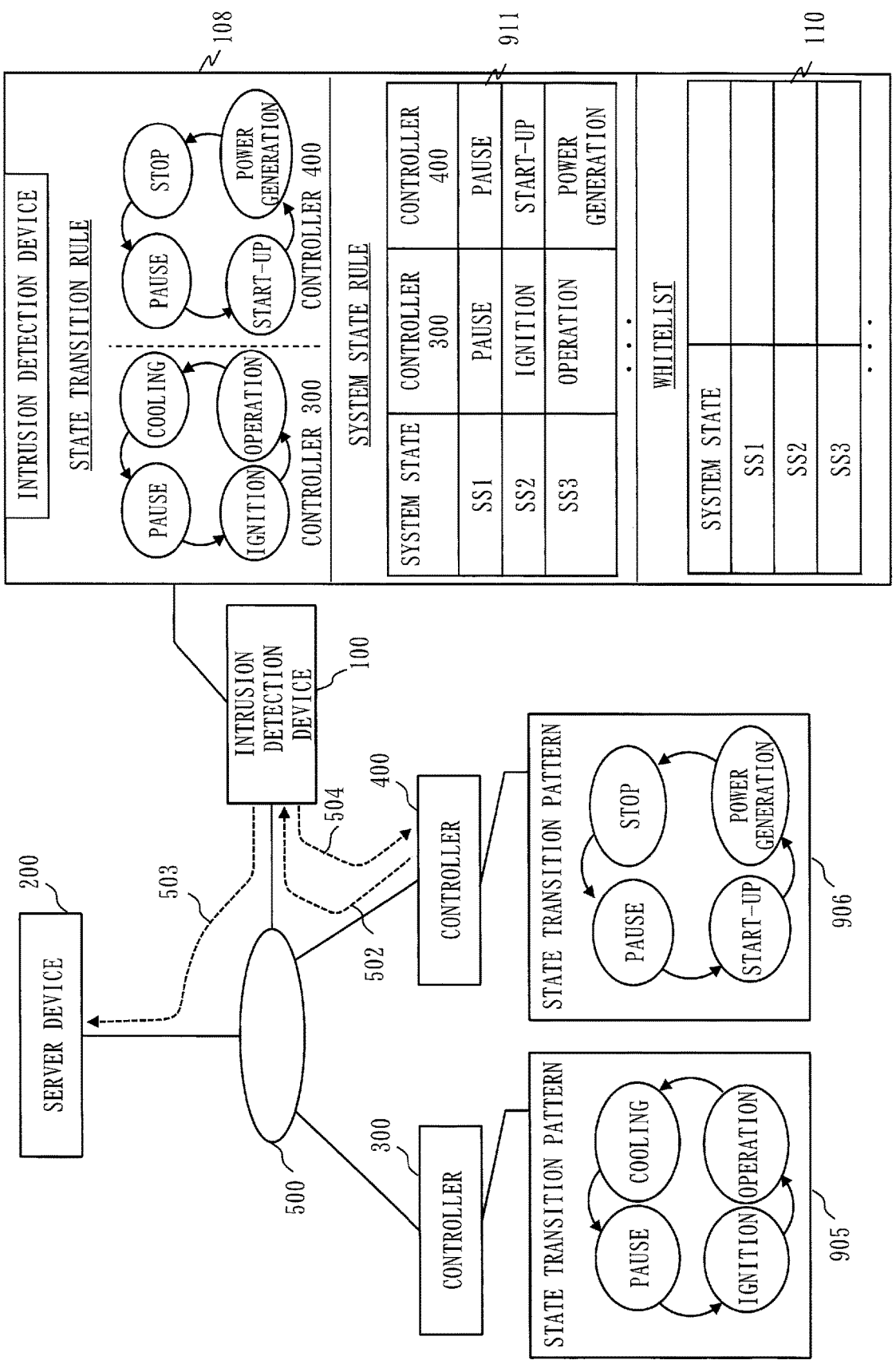
FIG. 5 is a diagram illustrating an example of an operation of the intrusion detection device according to the embodiment 1.

The system state rule 911 is information illustrated in FIG. 5. As illustrated in FIG. 5, in the system state rule 911, for each system state, the control state of the controller 300 and the control state of the controller 400 are defined. That is, when the control state of the controller 300 is "pause" and the control state of the controller 400 is "pause", the system state is "SS1". Similarly, when the control state of the controller 300 is "ignition" and the control state of the controller 400 is "start-up", the system state is "SS2". Further, when the control state of the controller 300 is "operation" and the control state of the controller 400 is "power generation", the system state is "SS3".

In the system state rule 911, a combination of control states that cannot occur in the operation of the communication system 600 is not defined as a system state.

The state classification section 105 obtains the state transition rule 108 and the system state rule from the state transition information storage section 106.

Further, the state classification section 105 obtains the state information 111 from the communication interface section 101. Then, the state classification section 105 analyzes the state information 111 to detect the current control state of each controller. Further, the state classification section 105 determines whether the state transition of the controller is normal based on the state transition rule 108.

Furthermore, when the state transition of the controller is normal, the state classification section 105 identifies the system state based on the state of each controller and the system state rule 911.

Then, the state classification section 105 outputs system state information 107 indicating the identified system state to the attack determination section 103.

It is noted that when the current control state of the controller does not match the state transition rule 108, the state classification section 105 outputs state abnormality notification information 117 notifying the abnormality of the state to the attack determination section 103. Further, when the combination of the control states of the controller does not match the system state rule 911, the state classification section 105 outputs the state abnormality notification information 117 to the attack determination section 103.

The state classification section 105 corresponds to a state detection section.

The operation performed by the state classification section 105 corresponds to state detection processing.

The whitelist storage section 104 holds a plurality of whitelists 110 associated with the system states. Each of the whitelists 110 is a rule for permitting preset normal communication.

FIG. 7 illustrates an example of the whitelists 110 stored in the whitelist storage section 104.

Specifically, respective lines excluding the item of the system state illustrated in FIG. 7 are the whitelists 110. That is, each of the whitelists 110 includes items such as a protocol, transmission source information, transmission destination information, a data length, a command, a payload condition, a cycle condition and the like. Each whitelist 110 is associated with each system state. That is, each whitelist 110 is associated with a combination of states of the controllers.

The whitelist storage section 104 outputs the whitelist 110 selected by the attack determination section 103 to the attack determination section 103.

As stated above, strictly speaking, the whitelist 110 is the state of each line excluding the item of the system state, but hereinafter, for convenience of explanation, all information of one line including the item of the system state may also be referred to as the whitelist 110.

The attack determination section 103 obtains the system state information 107 from the state classification section 105. Then, the attack determination section 103 selects, from among the plurality of whitelists 110 stored in the whitelist storage section 104, the whitelist 110 associated with the system state indicated in the system state information 107.

That is, the attack determination section 103 selects the whitelist 110 associated with the combination of the states of a plurality of controllers detected by the state classification section 105.

Then, using the selected whitelist 110, the attack determination section 103 detects an attack on the communication system 600.

More specifically, the attack determination section 103 obtains communication data 109 from the communication interface section 101, and applies the selected whitelist 110 to the obtained communication data 109. That is, the attack determination section 103 determines whether the communication data 109 is permitted communication data. Unless all the attributes of the communication data 109 match all items (protocol, transmission source information, transmission destination information, data length, command, payload condition, cycle condition) of the whitelist 110, the attack determination section 103 determines that the communication data 109 does not conform to the whitelist 110. When the communication data 109 does not conform to the whitelist 110, the attack determination section 103 outputs a determination result 112 to the alarm section 102.

The attack determination section 103 corresponds to a selection section and an attack detection section. In addition, the operation performed by the attack determination section 103 corresponds to the selection processing and the attack detection processing.

When the alarm section 102 obtains the determination result 112 from the attack determination section 103, it transmits the alarm 113 to the server device 200.

The server device 200 presents the alarm 113 from the alarm section 102 to an operator. The server device 200 may display the alarm 113 on the display or may present the alarm 113 using a lamp or the like. In addition, the server device 200 may present the alarm 113 to the operator by voice. Further, the server device 200 may transmit the alarm 113 to another server device.

The whitelist generation section 115 generates the whitelist 110 and writes the generated whitelist 110 in the whitelist storage section 104.

*Description of Operation*

Next, an example of an operation of the intrusion detection device 100 will be described with reference to FIG. 3.

Figure 3:
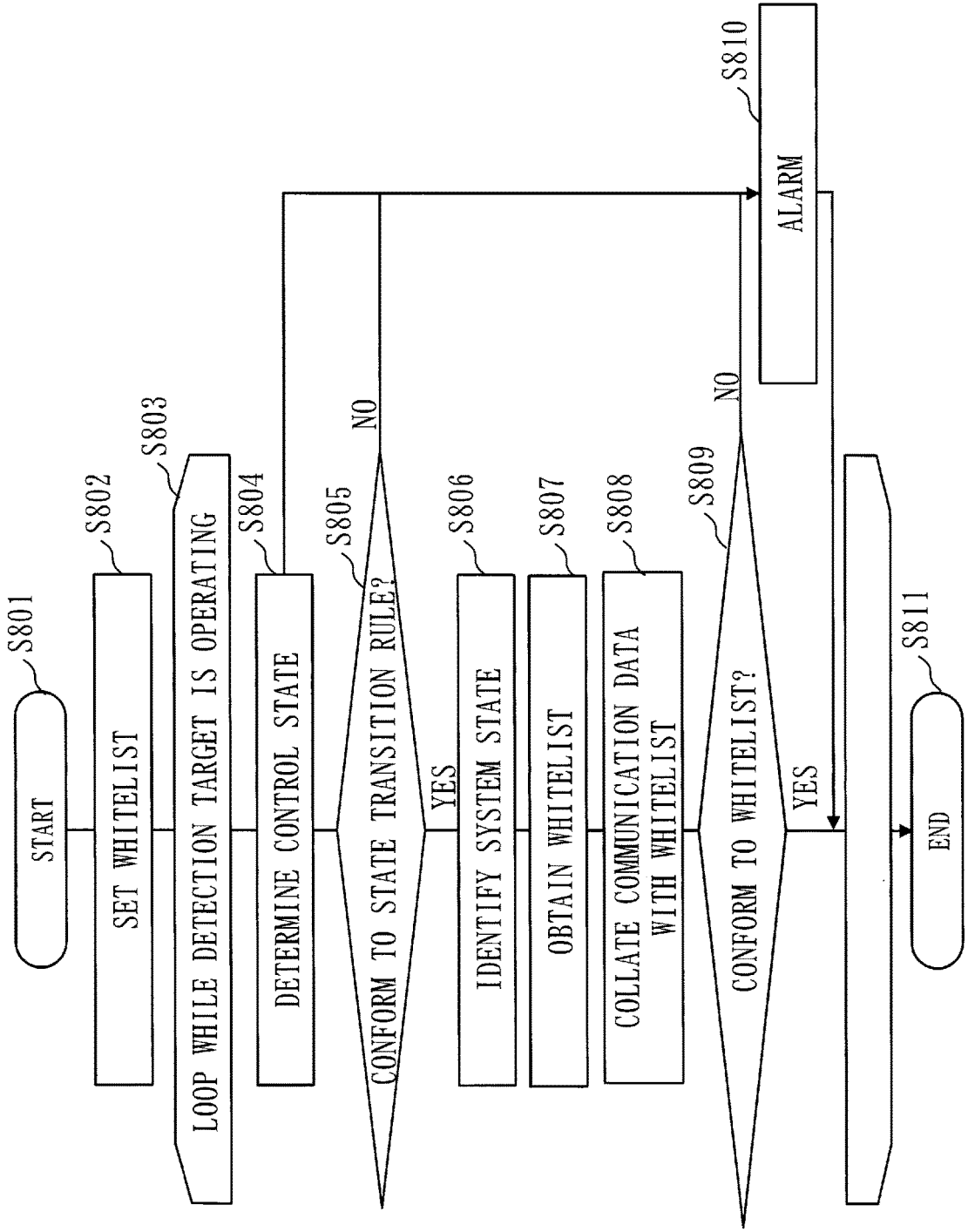
FIG. 3 is a flowchart illustrating an example of an operation of the intrusion detection device according to the embodiment 1.

FIG. 3 illustrates an example of the operation of the intrusion detection device 100, and the operation flow of the intrusion detection device 100 does not necessarily have to be as illustrated in FIG. 3.

In step S802, the state transition rule 108 and the system state rule 911 are set in the state transition information storage section 106 of FIG. 1, and the whitelist 110 is set in the whitelist storage section 104.

In step S803, while the detection target (the server device 200, the controller 300, the controller 400 and the like) is operating, the operation processing of the intrusion detection device 100 loops.

In step S804, the state classification section 105 analyzes the state information 111 to determine the current control state of each controller.

Next, in step S805, the state classification section 105 determines whether the current control state of the controller conforms to the state transition rule 108.

When the state classification section 105 determines that the current control state of the controller does not conform to the state transition rule 108, the state classification section 105 outputs the state abnormality notification information 117 to the attack determination section 103 because of an abnormal state transition. The attack determination section 103 obtains the state abnormality notification information 117 and outputs the determination result 112 notifying the occurrence of the abnormality to the alarm section 102. The alarm section 102 obtains the determination result 112 from the attack determination section 103, and transmits the alarm 113 to the server device 200 in step 810.

On the other hand, when the state classification section 105 determines that the current control state conforms to the state transition rule 108 in step S805, the state classification section 105 identifies the system state based on the system state rule 911 in step S806. Then, the state classification section 105 outputs the system state information 107 notifying the identified system state to the attack determination section 103.

In step S807, the attack determination section 103 obtains the system state information 107 and obtains the whitelist 110 associated with the system state notified by the system state information 107 from the whitelist storage section 104.

Next, in step S808, the attack determination section 103 collates the communication data 109 with the whitelist 110. That is, the attack determination section 103 obtains the communication data 109 from the server device 200 or the controller from the communication interface section 101, and collates the obtained communication data 109 with the whitelist 110 obtained in step S807.

In step S809, the attack determination section 103 determines whether the communication data 109 conforms to the whitelist 110.

When the communication data 109 does not conform to the whitelist 110, the attack determination section 103 outputs the determination result 112 notifying the occurrence of the abnormality to the alarm section 102. The alarm section 102 obtains the determination result 112 from the attack determination section 103, and transmits the alarm 113 to the server device 200 in step S810.

In step S809, when the attack determination section 103 determines that the communication data 109 conforms to the whitelist 110, if the detection target is in operation, the process returns to step S803. When the detection target finishes the operation, the intrusion detection device 100 stops its operation.

Next, the operation of the intrusion detection device 100 according to the present embodiment will be described with reference to a specific example illustrated in FIG. 5.

In the controller 300, a state transition such as "pause"→"ignition"→"operation"→"cooling"→"pause" is performed as in a state transition pattern 905.

In addition, in the controller 400, a state transition such as "pause"→"start-up"→"power generation"→"stop"→"pause" is performed as in a state transition pattern 906.

FIG. 5 illustrates the state transition rule 108 of FIG. 6 modified in the same form as the state transition pattern 905 and the state transition pattern 906.

The whitelist 110 in FIG. 5 is the whitelist 110 illustrated in FIG. 7 although the description thereof is omitted.

When obtaining the state information 502 from the controller 300, the state classification section 105 determines whether the current control state of the controller 300 conforms to the state transition rule 108 of the controller 300. For example, when the current control state of the controller 300 is "ignition", the state classification section 105 determines whether the state before transition to the state "ignition" is the state "pause".

Similarly, when obtaining the state information 502 from the controller 400, the state classification section 105 determines whether the current control state of the controller 400 conforms to the state transition rule 108 of the controller 400. For example, when the current control state of the controller 400 is "start-up", the state classification section 105 determines whether the state before transition to the state "start-up" is the state "pause".

When the control state of at least one of the controllers does not conform to the state transition rule 108, the state classification section 105 outputs the state abnormality notification information 117 to the attack determination section 103. The attack determination section 103 outputs the determination result 112 to the alarm section 102 based on the state abnormality notification information 117. The alarm section 102 transmits the alarm 503 to the server device 200 based on the determination result 112. In addition, at this time, a fail-safe execution section 114 described later may transmit a control signal 504 to the relevant controller. Details of the fail-safe execution section 114 and the control signal 504 will be described later.

Further, when the control state of the controller 300 conforms to the state transition rule 108 of the controller 300 and the control state of the controller 400 conforms to the state transition rule 108 of the controller 400, the state classification section 105 extracts from the system state rule 911, the system state corresponding to the combination of the control state of the controller 300 and the control state of the controller 400.

When the control state of the controller 300 is "ignition" and the control state of the controller 400 is "start-up", the state classification section 105 extracts the system state "SS2".

When the combination of the control state of the controller 300 and the control state of the controller 400 does not match the combination defined in the system state rule 911, the state classification section 105 outputs the state abnormality notification information 117 to the attack determination section 103. For example, when the control state of the controller 300 is "ignition" and the control state of the controller 400 is "pause", such a combination is not defined in the system state rule 911, thus, the state classification section 105 outputs the state abnormality notification information 117 to the attack determination section 103. The attack determination section 103 outputs the determination result 112 to the alarm section 102 based on the state abnormality notification information 117. The alarm section 102 transmits the alarm 503 to the server device 200 based on the determination result 112. In addition, at this time, the fail-safe execution section 114 may transmit the control signal 504 to the controller 300 and the controller 400.

The attack determination section 103 obtains the system state information 107 from the state classification section 105. For example, if the system state notified by the system state information 107 is "SS2", the attack determination section 103 obtains the whitelist 110 associated with the system state "SS2".

Then, the attack determination section 103 collates the communication data 109 from the server device 200, the controller 300 or the controller 400 with the whitelist 110 associated with the system state "SS2" to detect an attack on the communication system 600.

When the communication data 109 does not conform to the whitelist 110, the attack determination section 103 outputs the determination result 112 to the alarm section 102. The alarm section 102 transmits the alarm 503 to the server device 200 based on the determination result 112. In addition, at this time, the fail-safe execution section 114 may transmit the control signal 504 to the relevant controller.

*Another Configuration Example of the Intrusion Detection Device 100*

Figure 4:
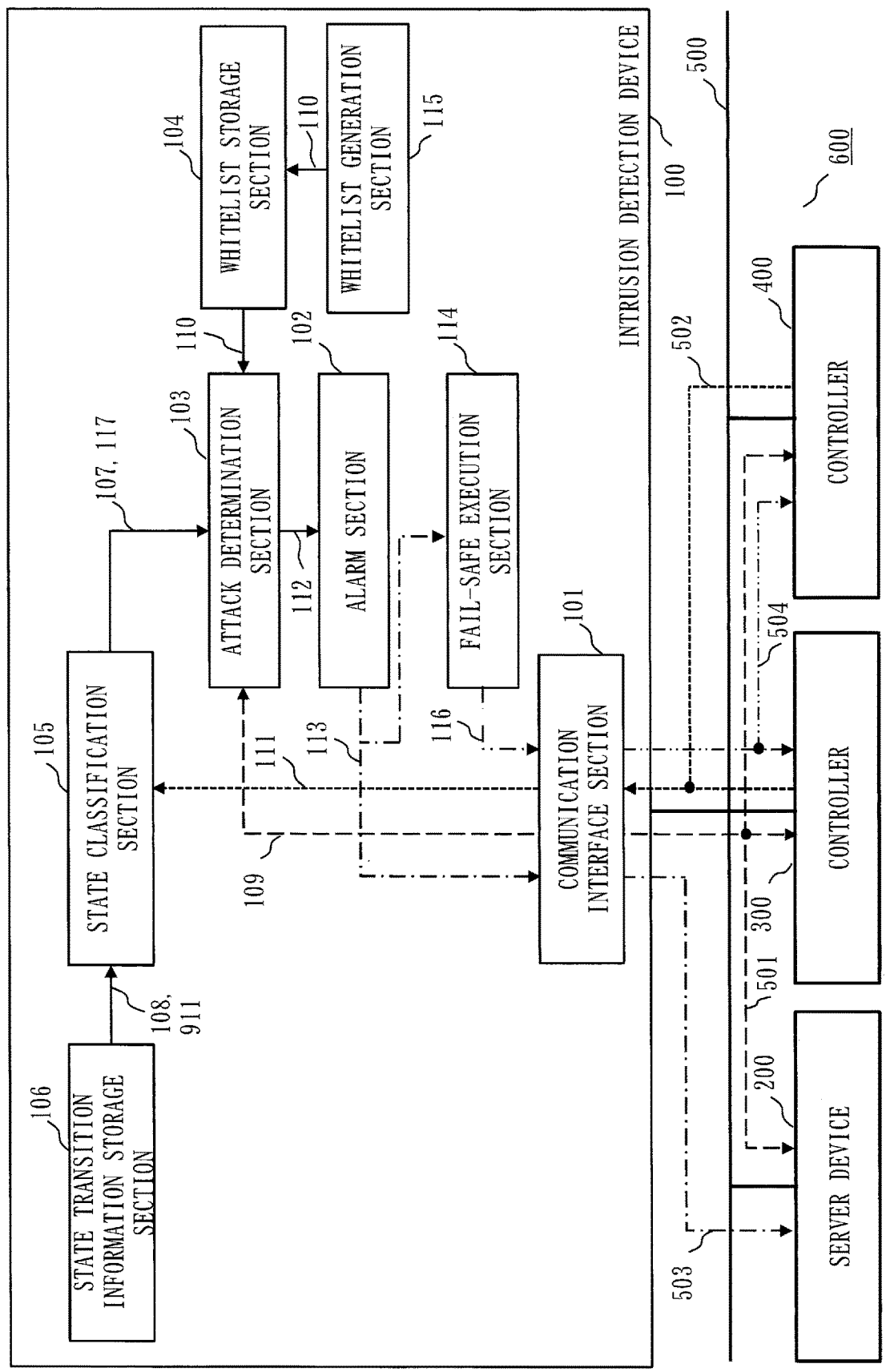
FIG. 4 is a diagram illustrating another example of a configuration of the intrusion detection device according to the embodiment 1.

FIG. 4 illustrates another example of a configuration of the intrusion detection device 100.

Compared with FIG. 1, the fail-safe execution section 114 is added in FIG. 4.

The fail-safe execution section 114 obtains the alarm 113 from the alarm section 102. Then, the fail-safe execution section 114 transmits a control signal 116 for fail-safe to each controller via the communication interface section 101. It is noted that the control signal 116 after being transmitted from the communication interface section 101 to the network 500 is indicated as the control signal 504.

The control signal 116 transmitted by the fail-safe execution section 114 is a signal for causing a controller involved in an attack on the communication system 600 to perform a fail-safe operation. The controller involved in the attack is, for example, the controller being the transmission source or the controller being the transmission destination of the communication data 109 determined not to conform to the whitelist 110 by the attack determination section 103. The fail-safe operation is, for example, a stop of the operation of the controller involved in the attack or the degraded operation of the controller involved in the attack.

As described above, the fail-safe execution section 114 transmits the control signal 116, so that the fail-safe of the controller can be executed.

The intrusion detection device 100 illustrated in FIG. 4 can also be realized with the hardware configuration illustrated in FIG. 2. The fail-safe execution section 114 is realized by, for example, a program. A program to realize the function of the fail-safe execution section 114 is stored in the auxiliary storage device 702. Then, the program is loaded into the memory 703, and the processor 701 executes the program.

In addition, in the intrusion detection device 100 illustrated in FIG. 4, the control signal 116 is transmitted by the fail-safe execution section 114 after step S810 in FIG. 3.

*Whitelist Generation Algorithm*

Figure 8:
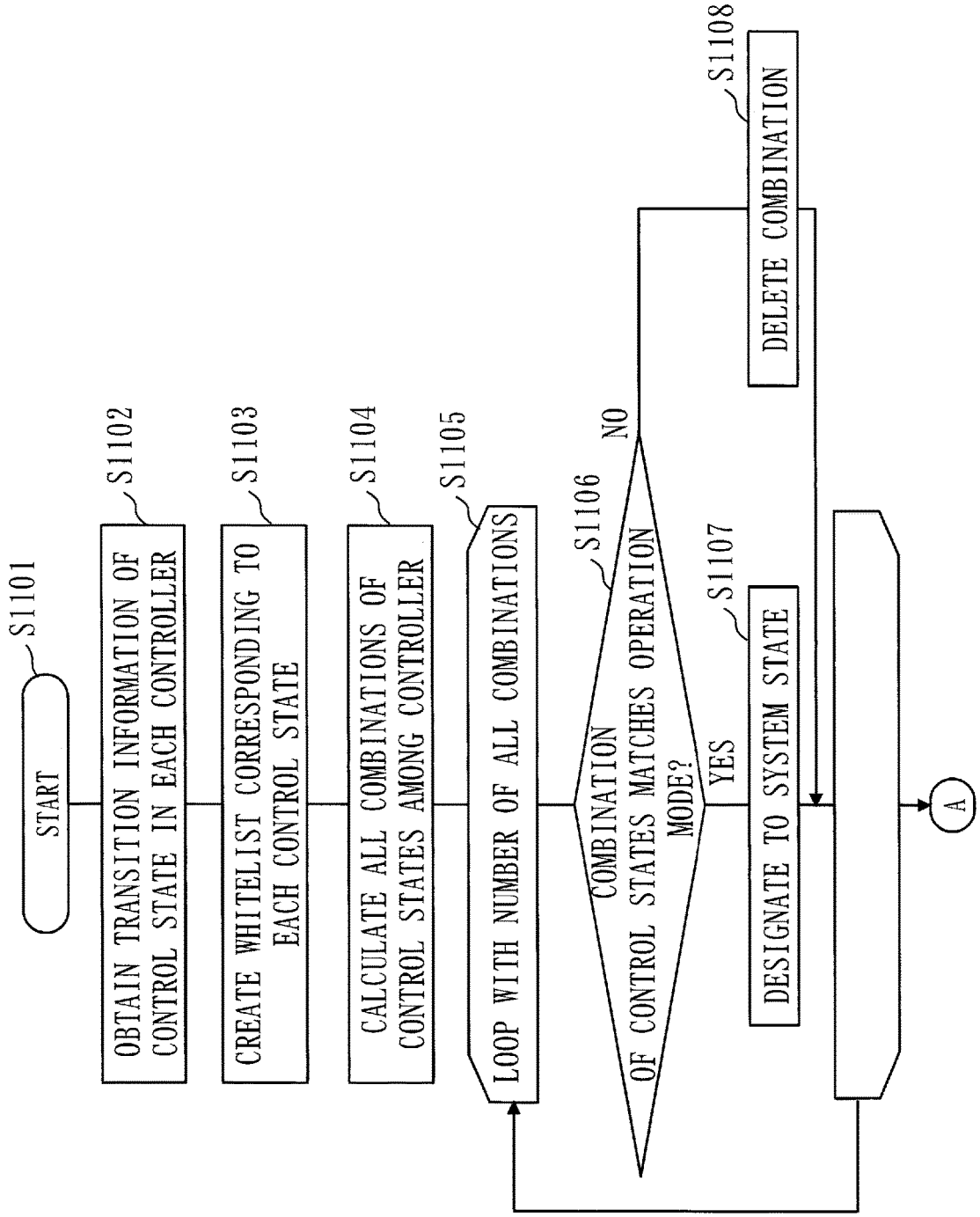
FIG. 8 is a flowchart illustrating a whitelist generation procedure according to the embodiment 1.
Figure 9:
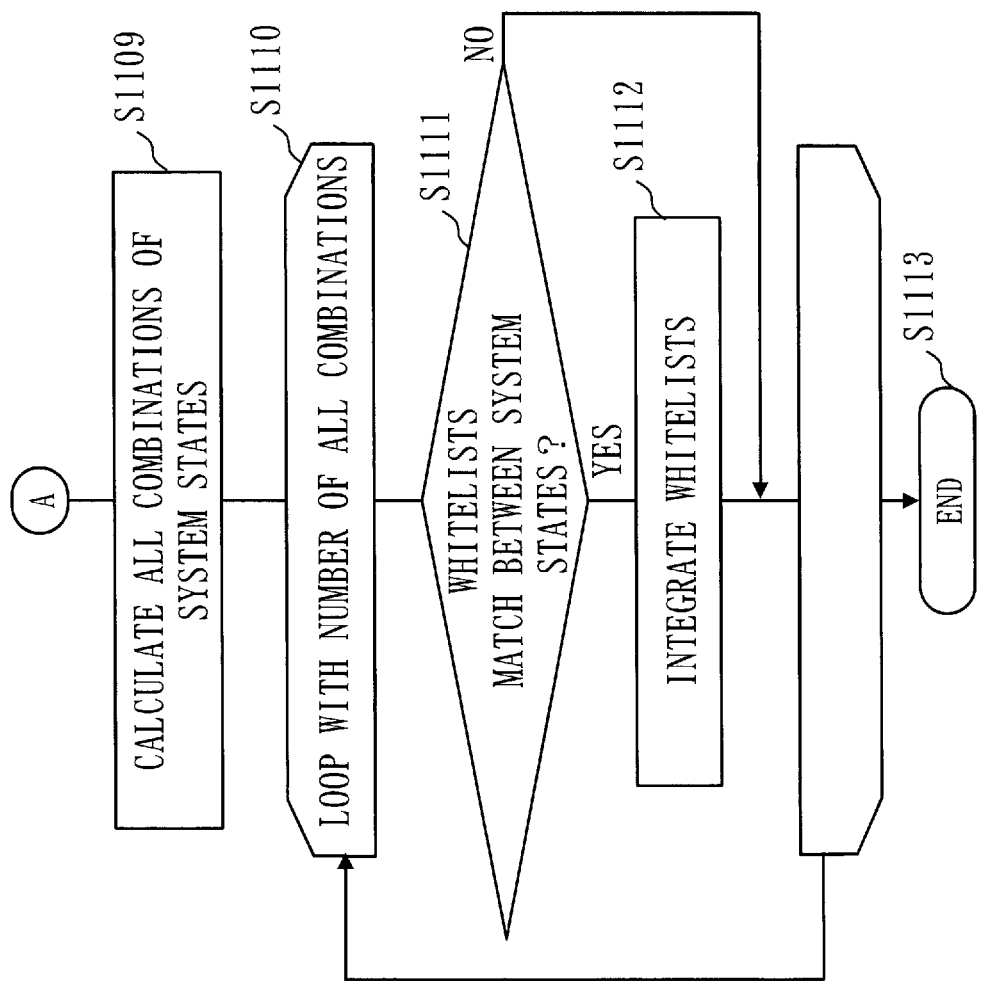
FIG. 9 is a flowchart illustrating a whitelist generation procedure according to the embodiment 1.

Next, the whitelist generation section 115 according to the present embodiment will be described with reference to FIGS. 8 and 9.

In step S1102, the whitelist generation section 115 obtains transition information of the control state in each controller from a file, for example. The transition information of the control state is preset. Here, the control state is the same as the control state output from the controller.

In step S1103, the whitelist generation section 115 creates a whitelist corresponding to each control state. The whitelist describes transmission source/destination information, a command, a payload, periodicity and the like of communication data permitted in each control state.

In step S1104, the whitelist generation section 115 calculates all combinations of control states among the controllers. When there are a huge number of controllers, not all the combinations are calculated, but the number of combinations may be limited.

In step S1105, the whitelist generation section 115 loops through steps S1106, S1107 and S1108 with the number of combinations obtained in step S1104.

In step S1106, the whitelist generation section 115 determines whether the combination of the control states matches the operation mode of the system.

If the combination of the control states matches the operation mode, in step S1107, the whitelist generation section 115 designates the combination of the control states as the system state.

On the other hand, if the combination of the control states does not match the operation mode of the system, in step S1108, the whitelist generation section 115 deletes the combination.

In step S1109, the whitelist generation section 115 calculates all combinations of system states. When there are a huge number of system states, not all the combinations are calculated, but the number of combinations may be limited.

In step S1110, the whitelist generation section 115 loops through step S1111 and step S1112 with the number of combinations obtained in step S1109.

In step S1111, the whitelist generation section 115 determines whether the whitelists match between system states.

If the whitelists match between the system states, in step S1112, the whitelist generation section 115 integrates the whitelists.

Explanation of the Effects of the Present Embodiment

In the intrusion detection device according to the present embodiment, a system state combining control states of a plurality of controllers is defined. Then, the intrusion detection device according to the present embodiment detects an attack on a communication system by using a whitelist prepared for each system state. Therefore, according to the present embodiment, it is possible to detect an attack, combination of which with communication which is determined to be normal based on the whitelist per device causes an abnormal operation.

The intrusion detection device according to the present embodiment is a network type intrusion detection device that monitors all communications of devices to be monitored (server device, controller) included in the communication system. Therefore, according to the present embodiment, it is possible to reduce the number of modifications for incorporating a detection function into the devices to be monitored, which has been a problem with the conventional host type intrusion detection device.

The intrusion detection device according to the present embodiment detects an attack by switching between whitelists according to the system state. Therefore, the intrusion detection device according to the present embodiment does not perform parallel detection processing for each device to be monitored. In addition, the intrusion detection device according to the present embodiment detects an attack with the minimum necessary whitelists. Therefore, the intrusion detection device according to the present embodiment does not require high level computational resources and a huge number of whitelists.

Furthermore, even when an attack accompanied by communication according to a communication sequence is performed from a computer taken over by an attacker, the intrusion detection device according to the present embodiment can detect the attack by searching a system state and applying a whitelist corresponding to the system state to communication data.

According to the intrusion detection device according to the present embodiment, an attack via the control/maintenance network can be detected even if the attack is from a terminal other than remote terminals, a control monitoring device and a maintenance terminal. In addition, since the intrusion detection device according to the present embodiment always obtains and monitors the state information of a controller, even if there is an abnormality in the state of the controller, the abnormality can be detected.

*Explanation of Hardware Configuration*

Finally, supplementary explanation of the hardware configuration of the intrusion detection device 100 in FIG. 1 will be described.

The processor 701 is an IC (Integrated Circuit) that performs processing. The processor 701 is, for example, a CPU (Central Processing Unit) or a DSP (Digital Signal Processor).

The auxiliary storage device 702 is, for example, a ROM (Read Only Memory), a flash memory, or an HDD (Hard Disk Drive).

The memory 703 is, for example, a RAM (Random Access Memory).

The communication device 704 includes a receiver for receiving data, a transmitter for transmitting data and the like. The communication device 704 is, for example, a communication chip or an NIC (network interface card).

An OS (Operating System) is also stored in the auxiliary storage device 702. Then, at least a part of the OS is loaded into the memory 703. While executing the OS, the processor 701 executes a program to realize functions of the alarm section 102, the attack determination section 103, the state classification section 105, the fail-safe execution section 114, and the whitelist generation section 115 (hereinafter collectively referred to as "sections").

By executing the OS by the processor 701, task management, memory management, file management, communication control and the like are performed.

In addition, the intrusion detection device 100 may include a plurality of processors that replace the processor 701. The plurality of processors share the execution of the program to realize functions of "sections". Like the processor 701, each of the processors is an IC that performs processing.

In addition, information, data, a signal value, or a variable value indicating the result of processing of "sections" is stored as a file in the memory 703, the auxiliary storage device 702, or the register or the cache memory in the processor 701.

Further, the program to realize functions of "sections" may be stored in a portable storage medium such as a magnetic disk, a flexible disk, an optical disk, a compact disk, a Blu-ray (registered trademark) disk, and a DVD.

Further, the "sections" may be read as "circuits" or "steps" or "procedure" or "processing".

Further, the intrusion detection device 100 may be realized by an electronic circuit such as a logic IC (Integrated Circuit), a GA (Gate Array), an ASIC (Application Specific Integrated Circuit), and a FPGA (Field-Programmable Gate Array).

In this case, each of the "sections" is realized as part of an electronic circuit.

It is noted that the processor and the above-mentioned electronic circuit are collectively referred to as processing circuitry.

Further, the intrusion detection device 100 may be connected to an input device and a display. When the intrusion detection device 100 is connected to input device and a display, the intrusion detection device 100 includes an input interface and a display interface as hardware.

REFERENCE SIGNS LIST

100: intrusion detection device, 101: communication interface section, 102: alarm section, 103: attack determination section, 104: whitelist storage section, 105: state classification section, 106: state transition information storage section, 114: fail-safe execution section, 115: whitelist generation section, 200: server device, 300: controller, 400: controller, 500: network, 600: communication system, 701: processor, 702: auxiliary storage device, 703: memory, 704: communication device.

The invention claimed is:

1. An intrusion detection device, comprising:
   a memory storing a respective predefined control state transition rule for each of the plurality of devices; and
   processing circuitry to:
      detect a current control state for each of a plurality of devices included in a communication system;
      determine, for each of the plurality of devices, whether the current control state detected for the device conforms to the respective predefined state transition rule stored for the device:
      determine a current system state corresponding to a combination of the current control states detected for the plurality of devices;
      determine whether the combination of the detected current control states of the plurality of devices corresponds to a predefined combination when the detected control state of each device is determined to conform to its respective predefined state transition rule;
      select, from among a plurality of whitelists each of which is associated with a combination of states, a whitelist associated with the current system state when the combination of the detected current control states is determined to correspond to the predefined combination; and
      detect an attack on the communication system by using the whitelist selected.

2. The intrusion detection device according to claim 1, wherein the processing circuitry causes a device involved in an attack on the communication system among the plurality of devices to perform a fail-safe operation when the attack on the communication system is detected.

3. The intrusion detection device according to claim 1, wherein the processing circuitry
   generates the plurality of whitelists, associating the plurality of whitelists with a plurality of combinations of control states, and
   selects, from among the plurality of whitelists generated, a whitelist associated with the combination of the detected control states of the plurality of devices.

4. An intrusion detection method, comprising:
   storing a respective predefined control state transition rule for each of a plurality of devices included in the communication system;
   detecting a current control state for each of the plurality of devices included in a communication system;
   determining, for each of the plurality of devices, whether the current control state detected for the device conforms to the respective predefined state transition rule stored for the device;
   determining a current system state corresponding to a combination of the current control states detected for the plurality of devices;
   determining whether the combination of the detected current control states of the plurality of devices corresponds to a predefined combination when the detected control state of each device is determined to conform to its respective predefined state transition rule;

selecting, from among a plurality of whitelists each of which is associated with a combination of states, a whitelist associated with the current system state; when the combination of the detected current control states is determined to correspond to the predefined combination; and detecting an attack on the communication system by using the selected whitelist.

5. A non-transitory computer readable medium storing an intrusion detection program that causes a computer to execute:

- a process of storing a respective predefined control state transition rule for each of a plurality of devices included in the communication system;
- a state detection process of detecting a current control state for each of the plurality of devices included in a communication system;
- a process of determining, for each of the plurality of devices, whether the current control state detected for the device conforms to the respective predefined state transition rule stored for the device;
- a current system state determining process of determining a current system state corresponding to a combination of the current control states detected for the plurality of devices;
- a process of determining whether the combination of the detected current control states of the plurality of devices corresponds to a predefined combination when the detected control state of each device is determined to conform to its respective predefined state transition rule;
- a selection process of selecting, from among a plurality of whitelists each of which is associated with a combination of states, a whitelist associated with the current system state when the combination of the detected current control states is determined to correspond to the predefined combination; and
- an attack detection process of detecting an attack on the communication system by using the whitelist selected by the selection process.

\* \* \* \* \*